(No Model.)

G. CAIN.
AIR BRAKE HOSE COUPLING.

No. 469,830. Patented Mar. 1, 1892.

WITNESSES.

INVENTOR.

George Cain
by W. Bakewell & Sons
his Attorneys.

UNITED STATES PATENT OFFICE.

GEORGE CAIN, OF WILMERDING, PENNSYLVANIA.

AIR-BRAKE HOSE-COUPLING.

SPECIFICATION forming part of Letters Patent No. 469,830, dated March 1, 1892.

Application filed October 30, 1891. Serial No. 410,309. (No model.)

*To all whom it may concern:*

Be it known that I, GEORGE CAIN, of Wilmerding, in the county of Allegheny and State of Pennsylvania, have invented a new and useful Improvement in Air-Brake Hose-Couplings, of which the following is a full, clear, and exact description, reference being had to the accompanying drawings, forming part of this specification, in which—

Figure 1:
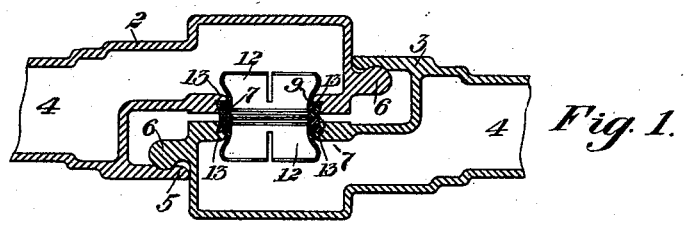
Figure 2:
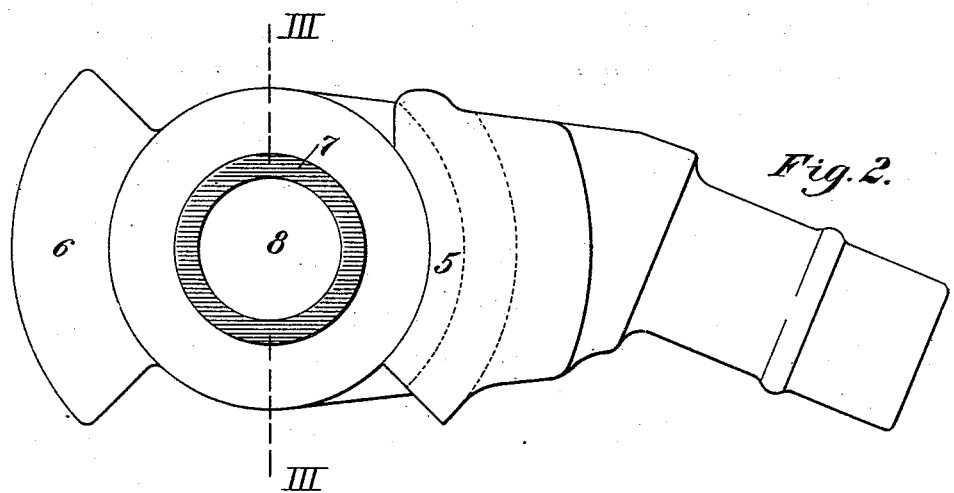
Figure 3:
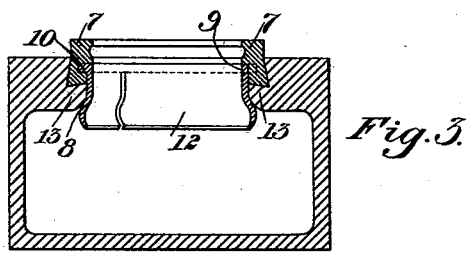
Figure 4:
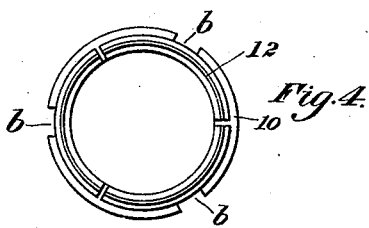
Figure 5:
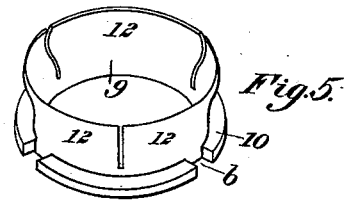

Figure 1 is a longitudinal vertical section through two of the coupling-shells, showing the openings in register. Fig. 2 is a plan view, on an enlarged scale, of one of the coupling-shells. Fig. 3 is a cross-section on the line III III of Fig. 2. Fig. 4 is a plan view of the metallic ring. Fig. 5 is a view in perspective of the ring.

In the drawings, 2 3 are the coupling-shells, each having a longitudinal passage extending through it and communicating with a tubular neck 4, which affords means for attachment to the usual hose. Each shell has a lateral opening 8 on its inner side. In coupling the shells together they are placed side by side with their lateral openings in register, and are pressed together by engagement of the usual flange 5 at the end of each shell with an inclined lip 6 at the side of the rear portion of the other shell, and when connected the forcing together of projecting annular rubber gaskets 7 at the sides of each shell makes an air-tight connection between the cavities of the shells. My invention relates to the construction of these gaskets and to the manner in which they are secured to the coupling-shells. Each gasket is secured firmly to a metal ring or base 9, having a marginal projecting flange 10, with projecting spring-arms or lips 12, preferably three or more in number. The rubber gasket is molded in a soft unvulcanized state around the flange of the ring 9, and when neatly fitted thereto is vulcanized, thus making a firm permanent connection between the gasket and metal ring. To hold these parts more securely together the flange of the ring may be notched at intervals, as at *b*, so that the rubber shall fit in these notches. The arms 12 are preferably bowed or curved, as shown, to give them a proper spring action and to hold them to the coupling-shell, as hereinafter explained. At the base of the opening 8 in the inner side of the coupling-shell is an internally-projecting annular bead or flange 13, forming a seat on its outer surface. In fitting the gasket to the coupling-shell the arms 12 of the metal ring are sprung within the flange 13, so that the edge of the rubber gasket shall sit against the flange and that the periphery of said gasket shall fit within the wall of the opening 8. (See Fig. 2.) The consequence is that the gasket is held securely to the coupling-shell, is not easily displaced, and it can be adjusted and held without necessity for forming cap-closed openings on the outer sides of the coupling-shells to permit inserting of the gaskets, as necessary in some other constructions. The gasket is preferably of cone shape peripherally, and the opening 8 is also made to conform thereto, so that when inserted the gasket is wedged in the opening and is still more securely held.

It will be understood that changes in the form and details of my improvement may be made without variance from my invention, as defined in the following claims.

I claim—

1. In hose-couplings, the combination, with the coupling-shell having a flanged opening for passage of fluid, such as air, of a gasket having a metal base provided with projecting arms adapted to fit within said flange, the gasket fitting in the opening against the flange, substantially as and for the purposes described.

2. In hose-couplings, the combination, with the coupling-shell having an opening for passage of fluid, such as air, of a gasket having a metal base, with spring-arms adapted to be fitted in said opening, substantially as and for the purposes described.

In testimony whereof I have hereunto set my hand this 24th day of October, A. D. 1891.

GEORGE CAIN.

Witnesses:
W. B. CORWIN,
H. M. CORWIN.